US012337495B2

(12) United States Patent
Venturini et al.

(10) Patent No.: US 12,337,495 B2
(45) Date of Patent: Jun. 24, 2025

(54) CUTTING APPARATUS AND METHOD FOR CUTTING A CAP

(71) Applicant: Sacmi Cooperativa Meccanici Imola Societa' Cooperativa, Imola (IT)

(72) Inventors: Matteo Venturini, Imola (IT); Davide Penazzi, Imola (IT)

(73) Assignee: Sacmi Cooperativa Meccanici Imola Societa', Imola (IT)

( * ) Notice: Subject to any disclaimer, the term of this patent is extended or adjusted under 35 U.S.C. 154(b) by 624 days.

(21) Appl. No.: 17/524,032

(22) Filed: Nov. 11, 2021

(65) Prior Publication Data

US 2022/0168917 A1 Jun. 2, 2022

(30) Foreign Application Priority Data

Dec. 2, 2020 (IT) ........................ 102020000029525

(51) Int. Cl.
*B26D 3/08* (2006.01)
*B26D 1/02* (2006.01)
*B26D 7/06* (2006.01)
*B26F 1/18* (2006.01)

(52) U.S. Cl.
CPC ................. *B26D 3/08* (2013.01); *B26D 1/02* (2013.01); *B26D 7/06* (2013.01); *B26F 1/18* (2013.01); *B26F 2210/04* (2013.01)

(58) Field of Classification Search
CPC .......... B26F 1/18; B26F 2210/04; B26D 3/08; B26D 1/38; B26D 9/00; B26D 1/02; B26D 7/06
USPC ........................................................... 83/731
See application file for complete search history.

(56) References Cited

U.S. PATENT DOCUMENTS 11,919,187 B2 * 3/2024 Flükiger ............... B26F 1/0038

FOREIGN PATENT DOCUMENTS

| | | | | |
|---|---|---|---|---|
| EP | 0667216 A1 * | 8/1995 | ............... | B26D 3/08 |
| EP | 2498960 | 9/2012 | | |
| EP | 3831557 A1 * | 6/2021 | ............... | B26D 1/01 |
| WO | WO-2011058500 A1 * | 5/2011 | ............. | B23Q 17/24 |

* cited by examiner

*Primary Examiner* — Nhat Chieu Q Do
(74) *Attorney, Agent, or Firm* — LAUBSCHER & FRETWELL, P.C.

(57) ABSTRACT

An apparatus for cutting capsules includes an engaging portion rotatable together with a spindle, the engaging portion including an axially protruding projection for abutting on an inner protrusion of the cap in a circumferential direction, and a contact surface for abutting an inner central region of the cap. The contact surface and the abutting surface are movable to achieve a phased angular orientation configuration with respect to a cutting device for cutting caps and an axial holding configuration. The inner protrusion of the cap has a preset angular position with respect to a circumferential score on a side wall of the cap. Cutting of the cap includes leading the axially protruding projection to a circumferential abutment on the protrusion, leading the contact surface to an axial abutment against the inner central region, and scoring the cap by the cutting device.

9 Claims, 7 Drawing Sheets

CUTTING APPARATUS AND METHOD FOR CUTTING A CAP

CROSS-REFERENCE TO RELATED APPLICATIONS

This application claims priority of IT-102020000029525 filed on Dec. 2, 2020. The entire content of this application is incorporated herein by reference.

The invention relates to an apparatus for cutting caps or stoppers, for instance made of plastics, of the type used for closing containers, such as bottles. In particular, the invention relates to an apparatus for making circumferential scores (at least for a part of a circumference or for the entire circumference) on a side wall of the caps. The scores made can determine, in the cap body, a warranty ring, or connecting portions (such as straps, or bands, or hinges, etcetera) between a warranty ring and a side wall of the cap, or define other portions of a cap.

BACKGROUND OF THE INVENTION

Apparatuses with a carousel-type structure are known, including spindles and cap gripping arrangements assembled on the periphery of the carousel, angularly spaced apart from each other and rotatable on themselves. Each spindle rotates the cap on itself and moves it along a circular advancement path, through one or more zones where cutting devices, that score or cut the side wall of the cap, are located.

Cutting devices are known to obtain a weakening line on the side wall of the cap, in order to form a warranty band, or horizontal openings on the side wall. The type of cut, carried out by such devices, is also known as “horizontal cut”.

Cutting devices are also known for cutting or scoring a side wall of a cap at preset radial positions, according to a position that is parallel or tilted relative to the cap axis, in order to obtain weakening areas in the warranty band, or define connecting portions (such as straps, hinges, etcetera) between the warranty band and the remainder of the cap side wall. This type of cut is also known as “vertical cut”.

Cutting apparatuses are known including cutting devices adapted to carry out both a horizontal cut and a vertical or tilted cut on the side wall of the cap at preset radial positions of the cap.

A drawback of the prior art cutting apparatuses is that the cap is supplied to the spindle in a wrong initial position in which predetermined start- or end-of-cut radial positions are not phased with the spindle and the cutting devices.

A further drawback of the prior art cutting apparatuses is the sliding between spindle and cap, especially during contact with the cutting devices.

The wrong initial position of the cap and the sliding cause a loss of synchronisation between the cap and the components of the cutting apparatus. This can imply that cuts are carried out on the caps at spatial positions different from the expected ones, reducing the functionality of the end product.

In order to overcome the aforesaid drawback, it is known providing a gripping arrangement, mounted on the spindles, including radially movable elements, shaped so as to hold the cap from inside thereof, pushing radially against many points of the side wall.

However, the gripping arrangement consists of a plurality of components that make these known cutting apparatuses complicated.

SUMMARY OF THE INVENTION

An object of the invention is to improve the cutting apparatuses of the prior art.

An object of the invention is to make an apparatus for cutting caps capable of solving the aforesaid limits and drawbacks of the prior art.

An object of the invention is to ensure a correct positioning of the cuts made on the caps.

An advantage of the invention is to allow precisely orienting the cap with respect to the cutting device.

An advantage of the invention is to limit or remove the sliding between the cap and the spindle of the cutting apparatus.

An advantage is to reduce the production waste of the caps equipped with notches.

These and other objects and advantages are obtained by a cutting apparatus according to one or more of the hereinafter reported claims.

In one example, an apparatus for cutting caps includes: an advancement path travelable by the cap; a cutting zone arranged on the advancement path; a spindle which is movable along the advancement path and rotatable around a rotation axis, the spindle being configured to rotate the cap around the rotation axis; a support which is movable along the advancement path together with the spindle and which is configured so that the cap is holdable between the support and the spindle; a cutting device for making a score in the cap when the spindle is in the cutting zone; wherein the spindle includes, in particular, an engaging portion facing the support so as to interact in contact with the cap arranged on the support, the engaging portion being rotatable together with the spindle, the engaging portion including a projection protruding axially from a peripheral region of the engaging portion towards the support, where “axially” is intended with reference to the rotation axis, the projection including at least one abutting surface configured to abut on a portion of the cap in a circumferential abutting direction, where “circumferential” is intended with reference to the rotation axis, so as to stop a relative rotation between the cap and the spindle in a preset position so as to orient the cap with respect to the cutting device, the engaging portion including a contact surface arranged in a central region of the engaging portion so as to be able to contact the cap and hold axially the cap on the support, the central region being traversed by the rotation axis, the peripheral region being further from the rotation axis than the central region, the contact surface and the at least one abutting surface being movable in axial direction relative to each other so as to be able to take a phased angular orientation configuration, in which the contact surface does not axially hold the cap on the support and in which the at least one abutting surface abuts on the portion of the cap in the circumferential abutting direction, and an axial holding configuration, in which the contact surface holds axially the cap on the support and in which the at least one abutting surface abuts on the portion of the cap in the circumferential abutting direction.

In one example, the method for cutting a cap includes the steps of: arranging a cap on a support with an outer face of a base wall of the cap abutting the support; advancing the support along an advancement path; approaching an engaging portion of a spindle to an inner face of the base wall of the cap; rotating the spindle around a rotation axis and advancing the spindle along the advancement path together with the support, the engaging portion rotating together with the spindle; leading the projection of the engaging portion to a circumferential abutment on the protrusion of the base wall of the cap to rotate the cap around the rotation axis and to stop a rotation of the cap in a preset position with respect to the spindle; leading a contact surface of the engaging portion to an axial abutment against a central region of the inner face of the cap to hold the cap against the support; leading the cap to a cutting zone; scoring a side wall of the cap by means of a cutting device.

BRIEF DESCRIPTION OF THE DRAWINGS

The invention shall be better understood and implemented with reference to the appended drawings which show some exemplary and non-limiting embodiments, wherein.

DETAILED DESCRIPTION

Figure 1:
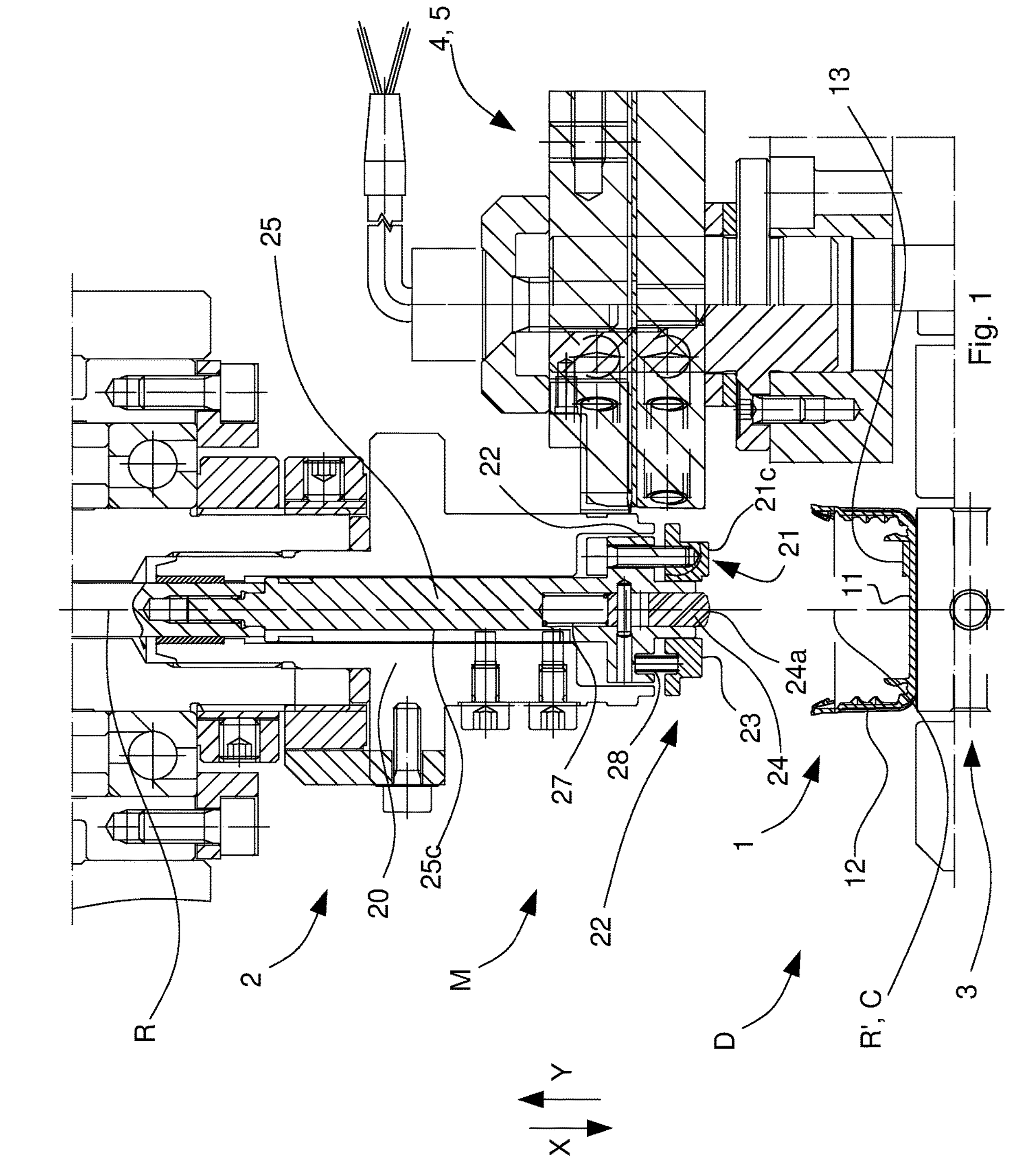
FIG. 1 is an axial section of a spindle and a support—for a plane passing through a spindle rotation axis—provided in an apparatus for cutting caps, in which an engaging portion of the spindle is shown in a first position and the support is shown in a spaced apart position.

Referring to FIGS. 1, 2, 3, 4, 4A, 5, 7 and 8, a cutting apparatus arranged for cutting or scoring stoppers or caps 1 is disclosed. The caps 1 can be used for closing containers, such as bottles.

Referring to the figures, each cap, made for example of plastic, has a cup-shaped body and includes, in particular, a circumferential zone where a circumferential score will be made.

The cap 1 includes, in particular, a base wall 11 defining a closed end of the cup-shaped body, the base wall includes an inner face 11*a* and an outer face 11*b* that are opposite from each other. In the specific example shown in FIG. 6, the base wall 11 is disc-shaped and includes a central region crossed by a longitudinal axis C which is, in particular, orthogonal to the base wall 11, and a peripheral region close to a peripheral edge of the disc and farther from the longitudinal axis C than the central region. The cap 1 includes, in particular, a side wall 12 adjoining the base wall 11 that extends about the longitudinal axis C of the cap 1 to a free edge of the base wall 11, which free edge defines an open end of the cup body. The side wall 12 may be, in particular, a cylindrical side wall coaxial to the longitudinal axis C. Such circumferential score is intended to separate the cap 1 in a main body including the closed end of the cap 1, and a warranty band including an open annular portion of the cap. The circumferential score may include a plurality of lines of intended detachment, or fracture lines, which can be arranged on the cap 1 according to various inclinations relative to the longitudinal axis C, to define on the capsule the main body, the warranty band and a possible connecting portion which connects the main body to the warranty band, i.e. a strap. The aforesaid circumferential zone may be arranged, in particular, on the side wall 12.

The cap 1 includes, in particular, a protrusion 13 projecting from the base wall 11 inside the cap 1 along a direction parallel to the longitudinal axis C. The protrusion 13 projects from the peripheral region of the inner face 11*a* of the cap 1. The protrusion 13 includes a rib extending in a radial direction relative to the longitudinal axis C.

Figures 5, 6, 7:
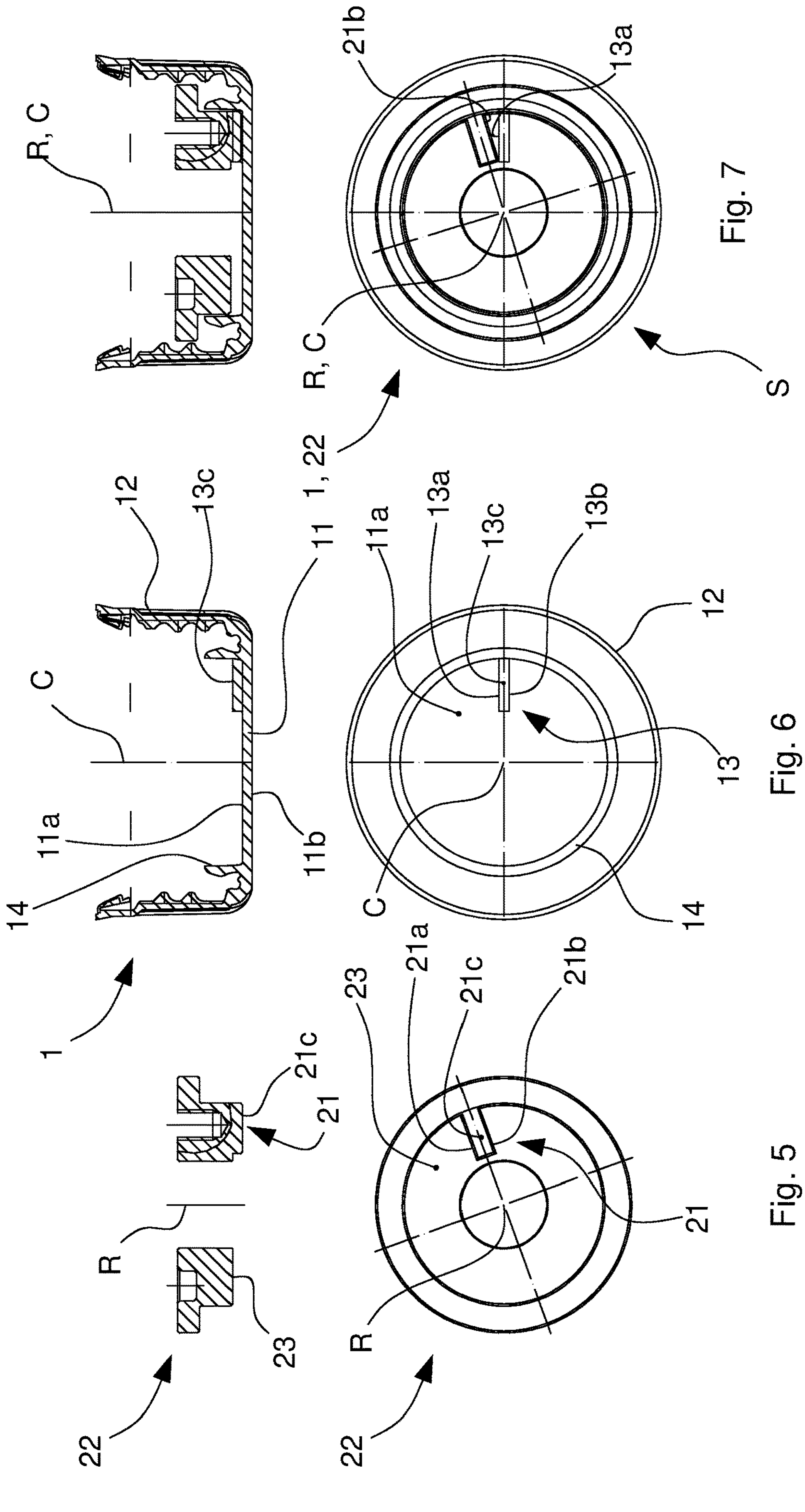
FIG. 5 shows an axial section of a head part of the engaging portion, as that in FIG. 1, and a view from below the head part, in which a rectangular plan projection is highlighted.
FIG. 6 shows an axial section of the cap—for a plane passing through a cap longitudinal axis—and a view from above of the cap, in which the protrusion is indicated.
FIG. 7 shows an axial section of the head part and of the cap, for a plane passing through the longitudinal axis of the cap and the rotation axis of the spindle, in which the cap is in a preset position with respect to the spindle and a section view from below in which the relative positions of the protrusion of the cap and of the projection in the preset position are highlighted.

Referring to the figures, in particular FIG. 6, the protrusion 13 has an elongated section—taken on a plane orthogonal to the longitudinal axis C—in particular rectangular, whose greater dimension is positioned radially with respect to the longitudinal axis C.

The protrusion 13 includes at least one side face 13*a*, 13*b* emerging from the inner face 11*a* of the base wall 11. The at least one side face 13*a*, 13*b* is configured, in particular, to operate as a circumferential abutting element and has a preset angular position with respect to the circumferential score to delimit one or more fracture lines of the warranty band and/or strap on the cap 1; the preset angular position act as a reference to phase the cap 1 with respect to a cutting device in such a way that those fracture lines start and end at desired locations.

The protrusion 13 includes a plurality of faces which, during the cutting operations inside the cutting apparatus, are in contact with surfaces of a spindle of a cutting apparatus; such abutting surfaces enable to maintain the cap in a predetermined radial position, or preset position, with respect to the spindle, or axial holding configuration, as will be hereinafter disclosed.

Referring to the specific example shown in FIG. 6, the protrusion 13 has a cuboid shape and the at least one side face 13*a*, 13*b* lies on a plane parallel to the longitudinal axis C. The at least one side face 13*a*, 13*b* may include a first side face 13*a* and a second side face 13*b*. In a version not shown, the at least one side face may be tilted with respect to the longitudinal axis of the cap. The protrusion 13 further includes an upper face 13*c* adjoining the at least one side face 13*a*, 13*b*. The upper face 13*c* may be, in particular, plane and linked with bevelled parts to the at least one side face 13*a*, 13*b*. In a version not shown the upper face 13*c* may be in particular curved. The protrusion 13 extends vertically in height for a length along the longitudinal axis C which is sensibly smaller than the height of the side wall 12.

The protrusion 13 further includes a free edge, i.e. a central end directed towards the longitudinal axis C, and a peripheral end directed towards the wall 12.

In an alternative version not shown, the protrusion may have a different shape, such as pin or rung shape.

Figure 6A:
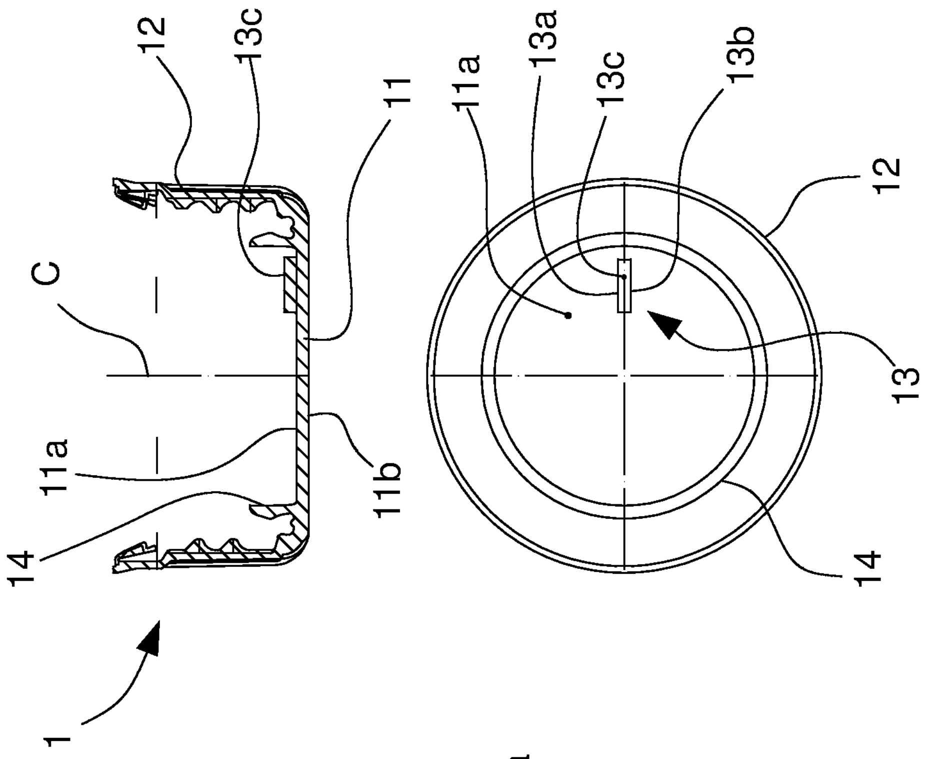
FIG. 6A shows an axial section and a view from above of the cap, in which a protrusion is spaced apart from an inner element of the cap.

The cap 1 may further include, in particular, an inner element, such as a sealing ring 14, which is arranged inside the cup body and connected to the inner surface 11*a* of the base wall 11. The sealing ring 14, substantially annular-shaped, coaxial with the longitudinal axis C, projects from the inner surface 11*a* of the base wall or wall inside the cup body of the cup 1 in the same extension direction of the side wall 12; in other words, the sealing ring 14 has an outer diameter that is smaller than that of the side wall 12. The sealing ring 14 extends throughout a length along the longitudinal axis C that is sensibly smaller than the height of the side wall 12 and sensibly greater than the height of the protrusion 13. The sealing ring 14 and the protrusion 13 may be integral parts of the cup body of the cap 1. Referring to the specific example of FIG. 6, the peripheral end of the protrusion 13 may be in particular adjoining the sealing ring 14. According to a further example shown in FIG. 6*a* the protrusion 13 may be in particular spaced apart from the sealing ring 14.

The cutting apparatus includes, in particular, an advancement path travelable by the cap 1 along an advancement direction T. Such an advancement path may include, in particular, an arc of circumference and is defined in a peripheral zone of a spindle-holder carousel (not shown) included in the cutting apparatus that rotates about a vertical revolution axis, in particular orthogonal to an apparatus horizontal base, and that makes a plurality of spindles 2 and a plurality of supports 3 arranged to move the caps 1 rotate about the vertical revolution axis.

Each spindle 2 has a corresponding support 3. The spindle 2 and the respective support 3 interact with one cap 1 at a time.

Each spindle 2 may thus move along the advancement direction T and may rotate about a rotation axis R thereof. Such rotation axis R may be in particular, vertical.

The support 3 may move along the advancement path together with the spindle 2 and is configured in such a way that the cap 1 is held between the support 3 and the spindle 2. The support 3 may be fixed in rotation with respect to an axis R' thereof. The axis R' is parallel to the rotation axis R of the spindle 2, in particular it is coaxial to the rotation axis R.

The support 3, furthermore, is movable along the axis R', or correspondingly along the rotation axis R if coaxial to the axis R', according to a lifting direction Y, to approach the spindle 2 so as to hold the cap 1 against the spindle 2 and according to a lowering direction X, opposite to the lifting direction Y so as to move away from the spindle 2. In other words, the support is axially movable to approach, and move away from the spindle 2 with the possibility of adopting a spaced apart position D, in which the support is far from the advancement path, and a gripping position E, in which the support is close to the advancement path to hold the cap 1 in the preset position.

The spindle 2 is shaped to interact with the cap 1 and to lead the cap 1 to rotate about a rotation axis coaxial to the rotation axis R, while the cap 1 is supported by the respective support 3. As will be hereinafter detailed, the spindle 2 is shaped to abut on the protrusion 13 so as to stop, in use, the rotation of the cap 1 in the preset position with respect to the spindle 2, so as to orient the cap 1 with respect to the spindle 2. Each cap 1 is thereby held between the spindle 2 and the respective support 3 to allow cutting operations thereon at preset positions of the side wall 12 with respect to the protrusion 13.

The cutting apparatus 1 may include a cutting zone 40, 50 reached and crossed by the spindle 2 and the support 3 while the cutting apparatus 1 is operating. The cutting zone 40, 50 may include, in particular, a horizontal cutting zone 40 and a vertical cutting zone 50 (FIG. 8) which are reached and crossed by the spindle 2 and the support 3 during the operation of the cutting apparatus 1. The cutting apparatus 1 further includes an inlet or feed zone and a discharge zone, not shown, downstream of the cutting zone 40, 50.

The cutting device 4, 5 may include at least one blade arranged to carry out a circumferential score including horizontal and/or vertical and/or oblique cuts on the cap 1 to make fracture lines on the cap for the warranty band and/or strap. The at least one blade has a preset position with respect to the spindle 2 such that a preset point of the at least one blade is always at a preset point of the spindle 2. In other words, the cutting device 4, 5 is synchronised, or phased, with the spindle 2.

Figure 8:
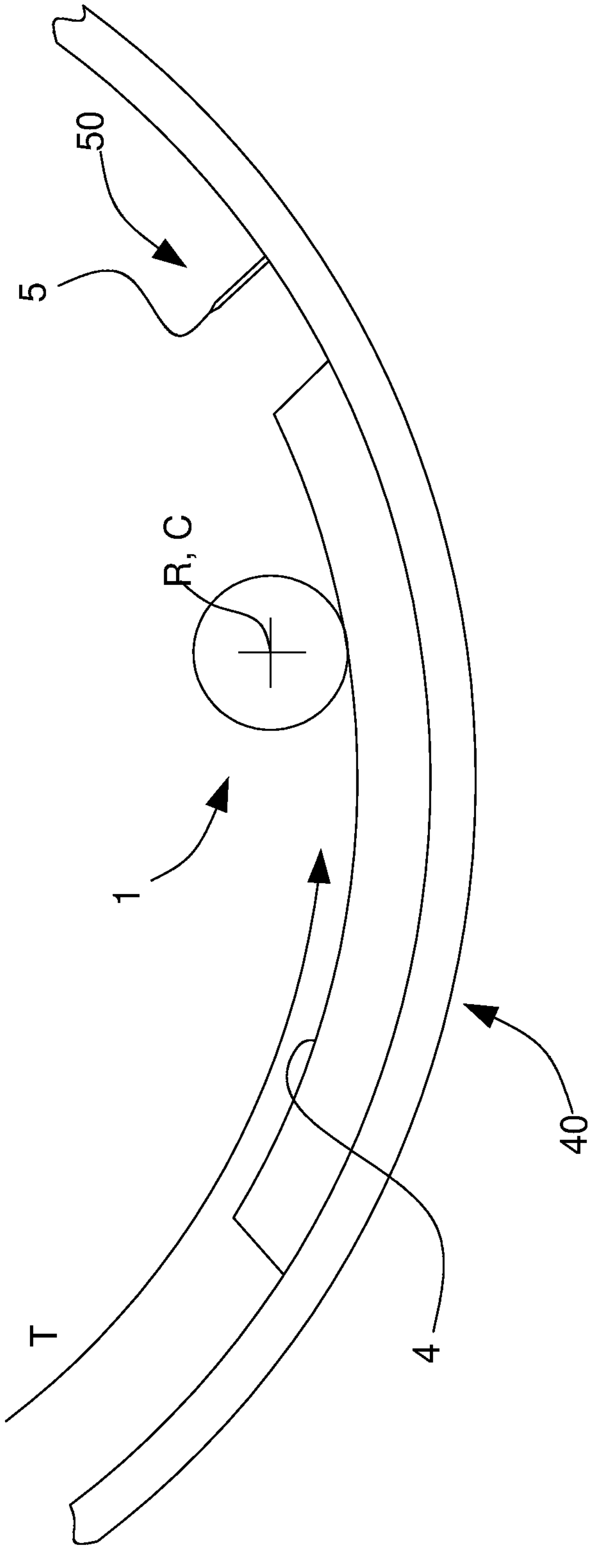
FIG. 8 is a schematic plan view of a portion of the cutting apparatus in which an advancement path of the cap and cutting devices are highlighted.

With reference to FIG. 8, when the cap 1 is in the horizontal cutting zone 40, the cap 1 interacts with a fixed cutting device 4 of the cutting apparatus, in particular, a horizontal-cut blade or knife, which provides scoring such a cap 1 according to a first horizontal direction parallel to a plane orthogonal to the longitudinal axis C of the cap 1.

The horizontal cutting zone 40 is downstream of the feed zone, on the advancement path along the advancement direction T.

When the cap 1 is in the vertical cutting zone 50, a vertical cutting device 5 of the cutting apparatus 1 provides making one or more scores on such cap 1 according to a direction substantially parallel to that of the longitudinal axis C of the cap 10, i.e. one or more vertical scores.

In the version depicted, the vertical cutting zone 50 is therefore, downstream of the horizontal cutting zone 40, on the advancement path. In a version not depicted, the vertical cutting zone 50 may be placed at the beginning the cap 1 advancement path and, in this case, the vertical cutting device 5 makes one or more vertical scores on the caps 1 before the horizontal cutting device 4 acts thereon. In another version not depicted, the horizontal cutting zone may be divided into two horizontal cutting zones spaced apart from each other, a first horizontal cutting zone of which is at the beginning of the advancement path and a second horizontal cutting zone of which is closer to the end of the advancement path, thus providing two horizontal cutting devices, each device being arranged in the respective horizontal cutting zone. In this version, the cutting device is interposed between the two horizontal cutting zones to make one or more vertical scores on the caps; in this case, the cut o score sequence includes at least one horizontal cut, then one or more vertical scores, then again at least one additional horizontal cut. The two horizontal cuts may not be recognised on the cap, both making up forming a weakening line which defines the warranty band.

The spindle 2 includes, in particular, an engaging portion 22, 24 facing the support 3 so as to interact with the cap 1 arranged on the support 3. Such engaging portion 22, 24 is rotatable together with the spindle 2 about the rotation axis R. The engaging portion 22, 24 is further movable according to a direction parallel to the rotation axis R to move closer to the support 3 along the lowering direction X and to move away from the support 3 along the direction Y. In other words, the engaging portion 22, 24 is movable between a first position M, in which the engaging portion 22, 24 is close to the advancement path, and a second position L, in which the engaging portion is far from the advancing path.

The engaging portion 22, 24 includes, in particular, a contact surface 24*a* arranged in a central region of the engaging portion 22, 24, so as to contact and axially hold the cap 1 on the support 3, where "axially" is intended with reference to the rotation axis R. The contact portion 24*a* is arranged, in particular, to contact the inner face 11*a* of the base wall 11 of the cap 1. The central region of the engaging portion 22, 24 is crossed by the axis R. The contact surface 24*a* is further movable with respect to the engaging portion 22, 24 along the rotation axis R.

In the specific example shown in the FIGS. 1 to 4, the contact surface 24*a* is obtained on a pusher element 24 having a cylindrical shape whose longitudinal axis extends along the rotation axis R. The contact surface 24*a* is arranged, in particular, on an end of the pusher element 24 facing the support 3. The contact surface 24*a* is curved and defines a convexity on the end of the pusher element 24. Such convexity has the function of creating a contact area between the pusher element 24 and the cap 1, that is as much punctiform as possible so as to avoid or limit the transmission of a rotary movement from the pusher element 24 to the cap 1. The pusher element 24 is movable along the rotation axis R. The pusher element 24 is equipped with an elastic member 27 for pushing the contact surface 24*a* against the cap 1, during operation. The elastic member 27 may in particular include an elastic element, such as a spring.

The engaging portion 22, 24 includes, in particular, a projection 21 which protrudes axially from a peripheral region of the engaging portion 22, 24 towards the support 3, along a direction parallel to the rotation axis R. The peripheral region of the engaging portion 22, 24 is positioned at a distance from the axis that is greater than a distance between the central region of the engaging portion 22, 24 and the rotation axis R. In other words, the peripheral region is farther from the rotation axis R with respect to the central region.

Referring in particular to FIG. 5, the projection 21 has a plan section, i.e. taken on an orthogonal plane R, that is elongated, in particular rectangular, in which greater dimension of the projection 21 is positioned radially with respect to the rotation axis R.

The projection 21 includes at least one abutting surface 21*a*, 21*b* configured to abut on a portion of the cap 1 in a circumferential abutting direction, where "circumferential" is intended with reference to the rotation axis, so as to stop a relative rotation between the cap 1 and the spindle 2 in a preset position so as to orient the cap with respect to the cutting device 4, 5.

The at least one abutting surface 21*a*, 21*b* may lie on a plane parallel to the rotation axis R. The projection 21 may further include, in particular, a lower surface 21*c* facing the support 3. The upper surface 21*c* may be, in particular, plane and linked with bevelled parts to the at least one abutting surface 21*a*, 21*b*. In a version not shown, the lower part 21*c* may be in particular curved. The at least one abutting portion 21*a*, 21*b* may, in particular, include a first abutting surface 21*a* and a second abutting surface 21*b*, opposite to the first abutting surface 21*a*. In particular, the at least one abutting surface 21*a*, 21*b* is arranged to contact the at least one side face 13*a*, 13*b* of the cap 1, during the rotation of the spindle 2 (or correspondingly the engaging portion 22, 24) about the rotation axis R, in the predefined position S in which the rotation of the cap 1 is synchronised with the rotation of the spindle 2.

Figure 5A:
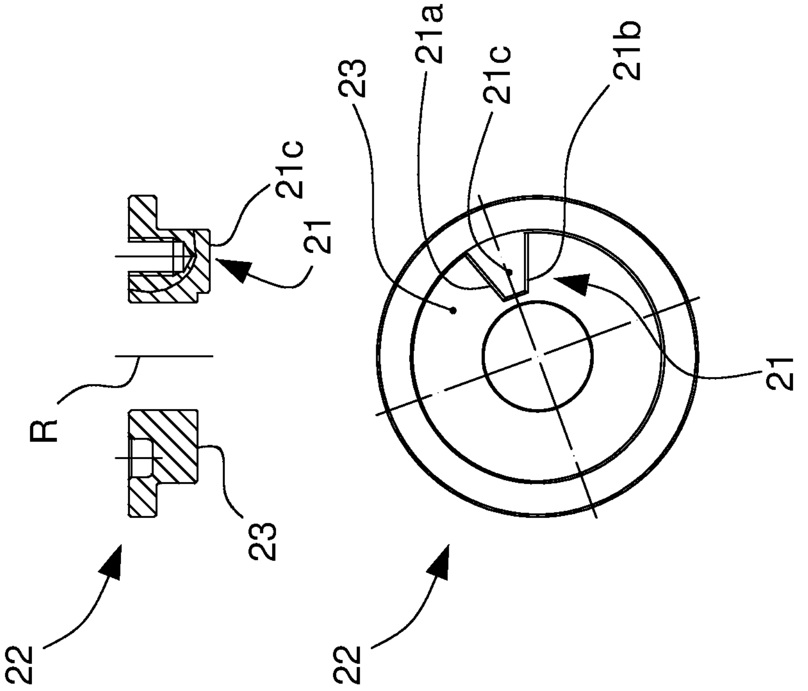
FIG. 5A shows an axial section and a view from below of the head part, in which a trapezoidal plan projection is highlighted.

Referring in particular to FIG. 5*a*, the projection 21 may have a trapezoidal plan shape. The tilting of the at least one wall 21*a*, 21*b* with respect to the rotation R may be selected such to obtain, in use, an optimal abutment area between the at least one wall 21*a*, 21*b* and the at least one side face 13*a*, 13*b* of the cap 1.

In the specific example of FIG. 7, in the preset position S of the spindle 2 with respect to the cap 1, the second abutting surface 21*b* contacts the first side face 13*a* since the rotation direction of the spindle 2 relative to the cap 1 is clockwise, observing the spindle 2 and the cap 1 from above. Alternatively, in a preset position not shown, the spindle rotates 2 in an anticlockwise direction and the first abutting surface 21*a* contacts the second side face 13*b* of the cap 1.

The contact surface 24*a* and the at least one abutting surface 21*a*, 21*b* are each other movable in an axial direction so as to take a phased angular orientation configuration, in which the contact surface 24*a* does not hold the cap 1 on the support 3 and the at least one abutting surface 21*a*, 21*b* abuts on the portion of the cap 1 in the circumferential abutting direction.

Figure 4:
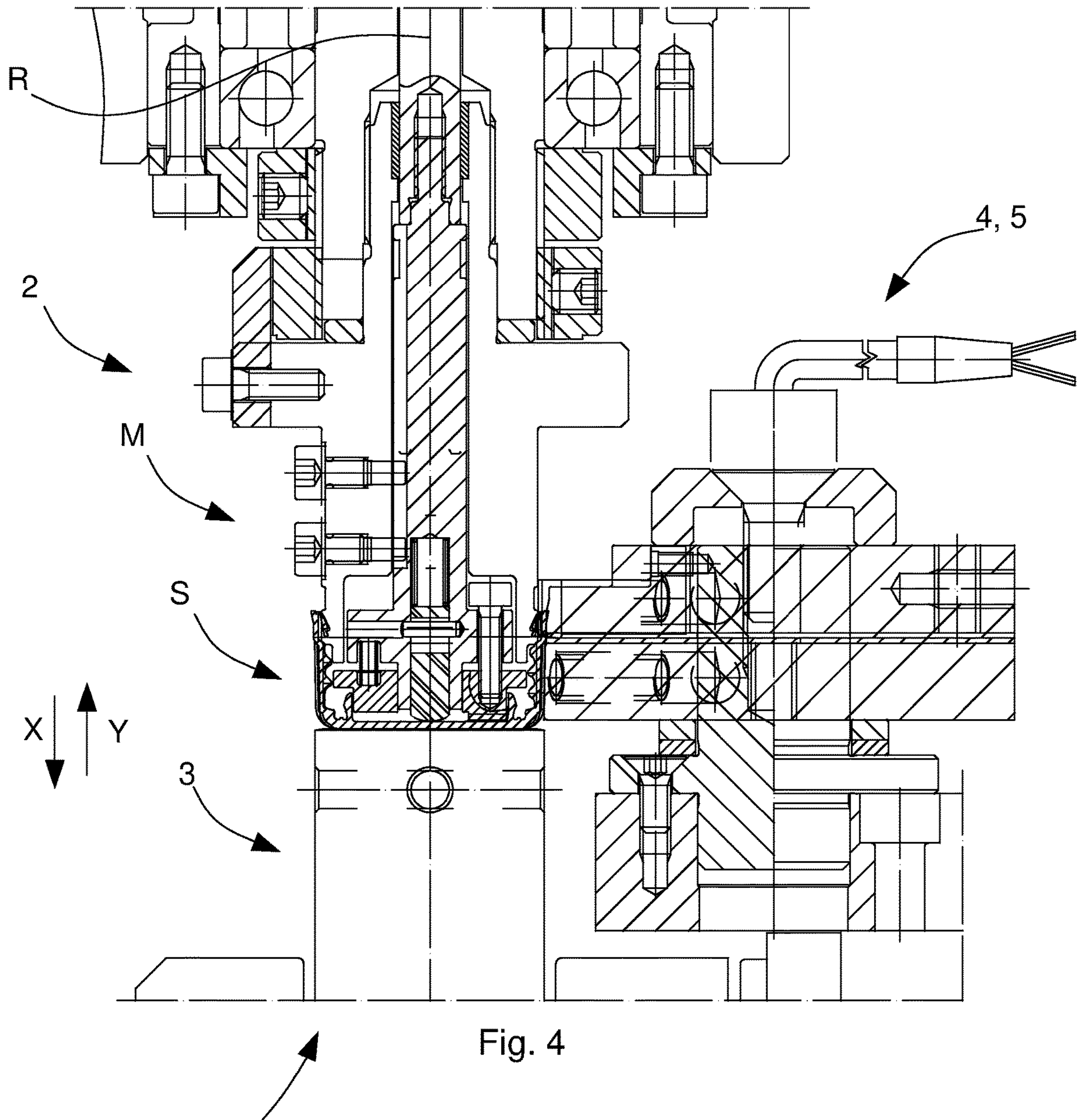
FIG. 4 is an axial section of the spindle and support, as that in FIG. 1, in which the engaging portion of the spindle is shown in the first position and the support is shown in a gripping position.
Figure 4A:
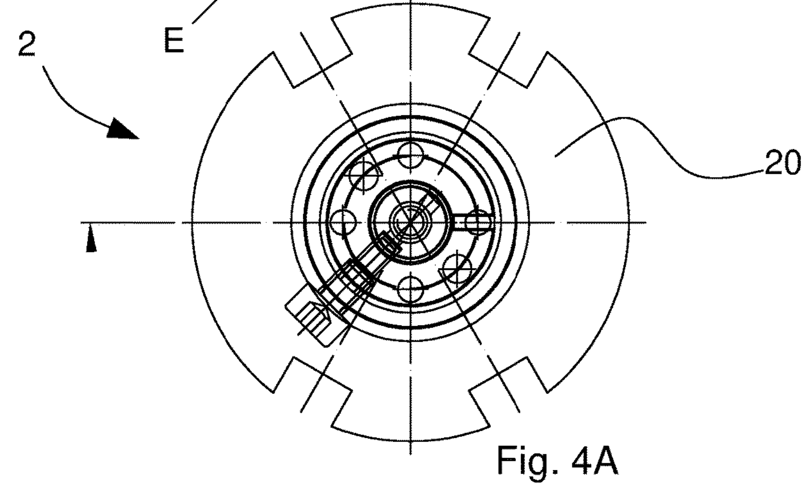
FIG. 4A is a transversal section of the spindle in FIG. 4.

Furthermore, the contact surface 24*a* and the at least one abutting surface 21*a*, 21*b* may take an axial holding configuration S, in which the contact surface 24*a* holds axially the cap 1 on the support 3 and in which the abutting surface 21*a*, 21*b* still abuts on the portion of the cap 1 in the circumferential abutting direction (FIGS. 4 and 7).

In other words, during the operation of the cutting apparatus, the cap 1 is arranged on the support 3 with the outer face 11*b* of the base wall 11 resting on the support 3, while the support 3 advances on the advancement path. The engaging portion 22, 24 approaches the inner face 11*a* of the base wall 11 of the cap 1, while the spindle 2 rotates together with the engaging portion 22, 24 and advances along the advancement path. While the spindle 2 approaches the support 3, the cutting apparatus is in a configuration similar to that shown in FIG. 2 in which the projection 21 is "flush with" the protrusion 13 of the cap 1, i.e. the lower surface 21*c* of the projection 21 is at the same height—measured along the rotation R—of the upper face 13*c* of the protrusion 13 of the cap 1. The engaging portion 22, 24 keeps on rotating about the rotation axis R while it axially lowers in the lowering direction X. In order to abut on the protrusion 13 in a circumferential direction, the projection 21 must now carry out a rotation about the rotation axis R not higher than a revolution. Once the at least one abutting surface 21*a*, 21*b* of the projection 21 abuts on the protrusion 13 in a circumferential direction, and the contact surface 24*a* does not hold the cap 1, the phased angular orientation configuration is reached. The engaging portion 22, 24 keeps on lowering, leading the contact surface 24*a* to contact against the inner face 11*a* of the cap 1; when the contact surface 24*a* holds the cap 1 against the support 3 and, at the same time, the at least one abutting surface 21*a*, 21*b* abuts the protrusion 13, the axial holding configuration, or accordingly the preset position S, is reached. The cap 1 is thereby phase-oriented with respect to the spindle 2 and the cutting device 4, 5.

Such protrusion 13 acts as an angular reference for the circumferential score. In fact, the intended detachment lines of the circumferential score, are arranged according to preset angular distances on the side surface 12 of the cap 1, which can be measured as angular distances with respect to the protrusion 13, with reference to the rotation axis R. Since the rotation of the spindle 2 and the advancement of the spindle 2 in the advancement path are synchronised with the cutting device 4, 5, in particular by means of a mechanical transmission, once the cap 1 is synchronised with the spindle 2, the cap 1 is synchronised with the cutting device 4, 5.

The projection 21 projects vertically downwards from a head surface 23 of the engaging portion 22, 24 facing the support 3. The head surface 23 has an annular shape, i.e. a circular crown having a smaller diameter and a greater diameter, and is positioned in the peripheral region of the engaging portion 22, 24.

In the specific example of the figures, the head surface 23 is placed externally with respect to the contact surfaces 24*a*. A diameter of the contact surface 24*a* is lower than the smaller diameter of the head surface 23, in which such diameters are measured on a plane orthogonal to the rotation axis R.

Referring to FIGS. 1 to 4 and 7, when the contact surface is in the axial holding configuration S, the head surface 23 is arranged at a vertical height greater than the contact surface 24*a* and the lower surface 21*c* is arranged a vertical height greater than the contact surface 24*a*, where heights are measured on the rotation axis R.

Figure 3:
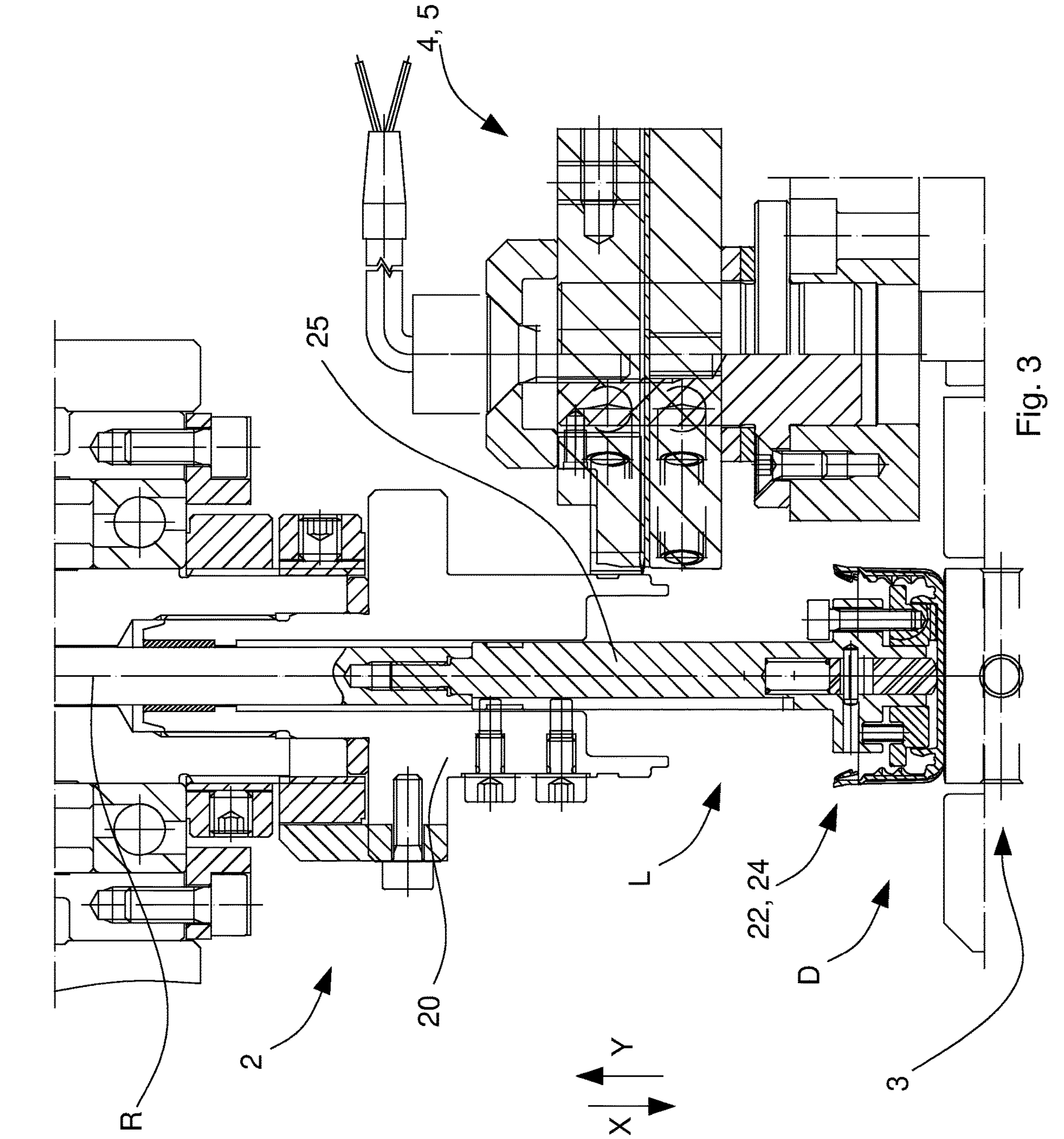
FIG. 3 is an axial section of the spindle and support, as that in FIG. 1, in which the support is shown in a spaced apart position and a projection of the engaging portion is at the same height as a cap protrusion.

The pusher element 24 may in particular be arranged in a retracted position on the rotation axis R, i.e. the contact surface may reach a vertical height greater than the height reached in FIG. 3. Such retracted position is in particular provided when the spindle 2 interacts with a cap equipped with an inner reinforcement element, for example in a sunburst arrangement, and/or a shaped panel, in which the central region of the base wall has a thickness greater than the thickness of a peripheral region of the base wall.

In use, when the engaging portion 22, 24 is engaged with the cap 1 (FIGS. 2, 3, 4 and 7), the head surface 23 is at a height greater than the upper face 13*c* of the protrusion 13 and the lower surface 21*c* of the projection 21 is at a height higher than the inner face 11*a* of the cap 1; during the operation, the projection 21 does not thereby interfere with the inner face 11*a* of the cap 1 while the at least one abutting surface 21*a*, 21*b* contacts the at least one side face 13*a*, 13*b*.

The spindle 2 includes, in particular, a base body 20 having a sleeve shape extending about the rotation axis R. The base body 20 is rotatable with the spindle 2 about the rotation axis R. When the cutting apparatus is operating, the base body 20 keeps the same vertical height while the spindle 2 advances on the advancement path.

The engaging portion 22, 24 may be arranged, in particular, on a gripping body 25 having an elongated shape and sliding with respect to the base body 20 along the rotation axis R. The gripping body 25 is rotatable with the base body 20 about the rotation axis R to allow the engaging portion 22, 24 to contact the cap 1 and rotate it. The rotation of the gripping body 25 with the base body 20 is enabled by a guide arrangement 26 arranged on the base body 20, which guide arrangement 26 engages a longitudinal groove 25*c* arranged on an elongated part 25*a* of the gripping body 25, blocking the relative rotation between base body 20 and gripping body 25 and enabling the axial sliding of the gripping body 25 with respect to the base body 20.

The head surface 23 is arranged on a head part 22 which is disc-shaped. The head part 22 is shaped to fit at least partially into the cap 1. In particular, the head part 22 is shaped to fit at least partially into the sealing ring 14 such to align, while operating, the longitudinal axis of the cap C with the rotation axis R.

Figure 2:
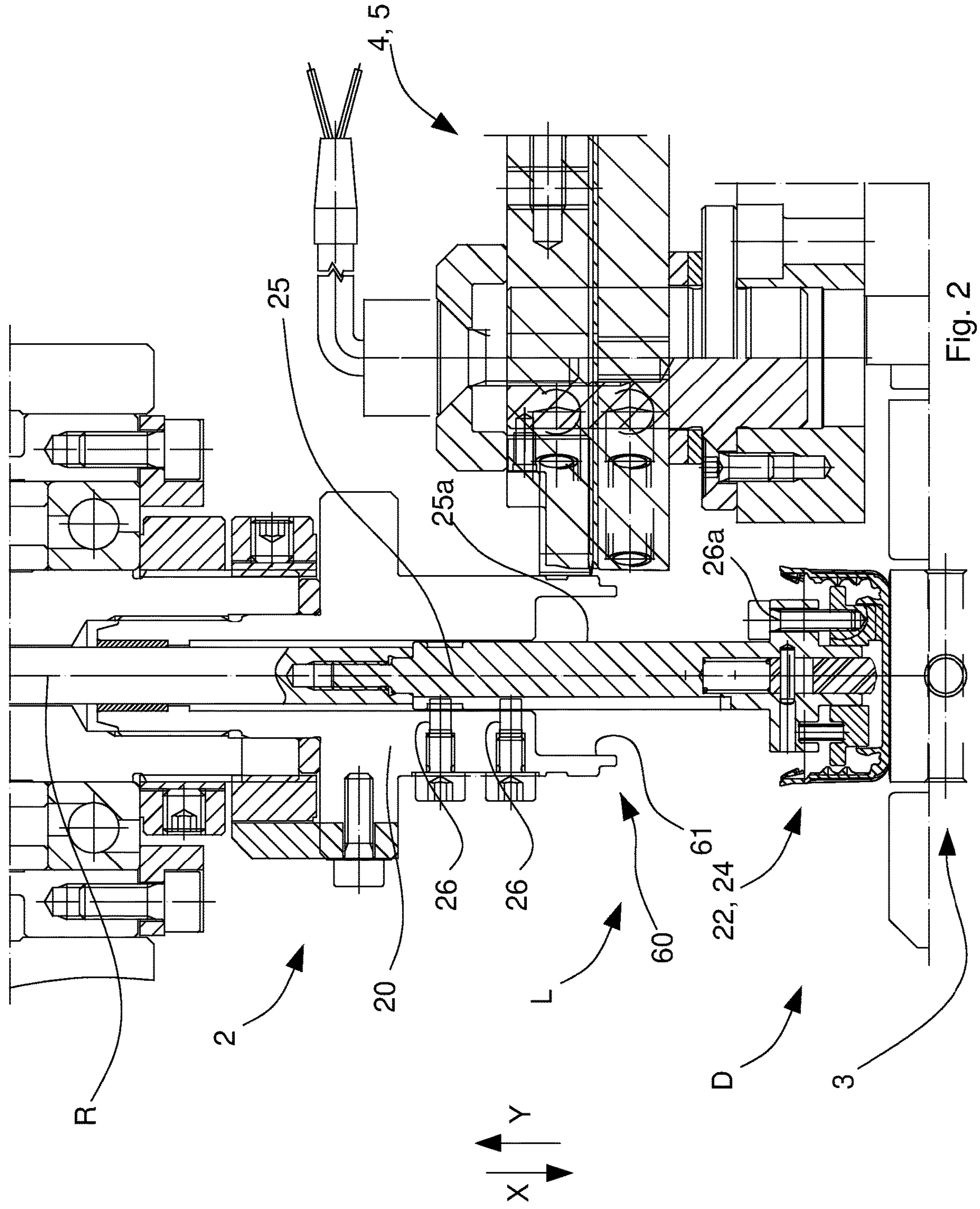
FIG. 2 is an axial section of the spindle and support, as that in FIG. 1, in which the engaging portion of the spindle is shown in a second position and the support is shown in a spaced apart position.

Furthermore, the cutting apparatus may include, in particular, a further elastic member 28 configured to exert an axial force on the projection 21 directed towards the support 3 such to allow the projection 21 to carry out axial displacements with respect to the gripping body 25 along a direction parallel to the rotation axis R. The further elastic member 28 may allow the projection 21 to abut on the cap 1 without holding it, such as when the projection 21 is vertically aligned with the protrusion 13 (FIG. 2). Referring to FIG. 1, the further elastic member 28 is connected to the base body 25 and the head part 22 and may include, in particular, an elastic element, such as a spring.

The spindle 2 may include, in particular, an adjustment device 26*a* to set a distance—measured along the rotation axis R—from the projection 21 to the support 3. This enables to adapt the projection 21 according to the height of the protrusion 13, so that the projection 21 can adapt to different types of caps 1. The adjustment device 26*a* may be connected to the base body 25 and the head part 22 and may include, in particular, a screw—nut screw coupling in which the distance from the projection 21 to the support 3 is adjusted by screwing or unscrewing such screw.

Referring to FIG. 2, the spindle 2 includes, in particular, an annular wall 60 external to the engaging portion 22, 24 which extends about a rotation axis R. The annular portion 60 is arranged to provide an abutment to the cutting device 4, 5. In fact, in order to carry out the circumferential score on the cap 1, the engaging portion 22, 24 and the support 3 lead an inner portion of the side wall 12 of the cap 1 to contact the side wall 60 of the spindle 2 and place the side wall 12 between the annular wall 60 and the cutting device 4, 5. The annular wall 60 is, in particular, arranged on the base body 20 of the spindle 2 and delimits a cavity 61 arranged to house, at least partially, the gripping part 22, 24 when the gripping part is in the aforesaid first position M.

The cutting apparatus as disclosed is suitable to implement a cutting method to be applied to the cap 1.

Referring to FIG. 1, the method includes, in particular, arranging the cap 1 on the support 3 such that the outer face 11*b* of the base wall 11 of the cap 1 rests in contact with the support 3. Furthermore, the method includes, in particular, a step of advancing the support 3 and the engaging portion 22, 24 of the spindle 2 along the semi-circular advancement path defined by the spindle-holder carousel included in the cutting apparatus, in which the support 3 is in a spaced-apart position D, i.e. in a position in which the support 3 is far from the advancement path travelable by the cap 1 and the engaging portion 22, 24 is in a first position M close to the advancement path.

Referring to FIG. 3, the method includes, in particular, axially approaching the engaging portion 22, 24 of the spindle 2 to the inner face 11*a* of the base wall 11 of the cap 1, i.e. leading the engaging portion 22, 24 in a second position L in which the engaging portion 22, 24 is far from the advancement path and close to the support 3; rotating the spindle 2 about the rotation axis R and advancing the spindle 2 along the advancement path together with the support 3, while the engaging portion 22, 24 rotates together with the spindle 2.

Such method includes, in particular, a step of leading the projection 21 of the engaging portion 22, 24 to circumferentially abut on the protrusion 13 of the base wall 11 of the cap 1, to rotate the cap 1 about the rotation R and to stop a rotation cap 1 in the preset position S with respect to the spindle 2. Such step of leading to a circumferential abutment includes, in particular, leading an abutting surface 21*a*, 21*b* to abut on the side face 13*a*, 13*b* of the protrusion 13.

Furthermore, referring to FIGS. 4 and 7, the method includes, in particular, a step of leading the gripping surface 24*a* of the engaging portion 22, 24 to axially abut on a central region of the inner face 11*a* of the cap 1, to axially hold the cap 1 against the support 3 and thus hold the cap 1 in the preset position S. In the step of axial abutment, the engaging portion 22, 24 is in the first position M in which it is close to the advancement path and the support 3 is in the gripping position E, in which the support is close to the advancement path.

Referring to FIG. 8, the method includes, in particular, a subsequent step of leading the cap 1 in the cutting zone 40, 50 and scoring the side wall 12 by means of the cutting device 4, 5. The step of scoring may include positioning the side wall 12 of the cap 1 between the annular wall 60 of the spindle 2 and the cutting device 4, 5.

As it can be inferred from the foregoing, the cutting apparatus and the cutting method according to the present invention allows to overcome the limits and drawbacks of the apparatuses and methods of the prior art, in order to successfully reach the preset objects.

Thanks to the invention, it is possible to synchronise the movement of the cap to be cut with the respective spindle and cutting devices.

The apparatus and method according to the invention are particularly useful to make scores on a cap, in particular on a cap provided with an inner protrusion.

The invention claimed is:

1. A cutting apparatus for cutting a cap, the apparatus comprising:

a path along which the cap is movable:

a cutting zone arranged on said path;

a spindle which is movable along said path and rotatable around a vertical rotation axis, said spindle being configured to rotate the cap around said vertical rotation axis;

a support which is movable along said path together with said spindle and which is configured so that the cap is held between said support and said spindle; and a cutting device for making a score in the cap when said spindle is in said cutting zone;

wherein said spindle includes an engaging portion facing said support to interact in contact with the cap arranged on said support, said engaging portion being rotatable together with said spindle;

said engaging portion including a projection protruding axially with respect to said rotation axis from a peripheral region and vertically downwardly from a head surface of said engaging portion towards said support;

said projection including at least one abutting surface configured to abut on a protrusion extending from a base wall of the cap in an axial direction and in a circumference abutting direction relative to said rotation axis to stop a relative rotation between the cap and said spindle in a preset position to orient the cap with respect to said cutting device;

said engaging portion including a contact surface arranged in a central region of said engaging portion so as to be able to contact the cap and axially hold the cap on said support, said central region being traversed by said rotation axis, said peripheral region being further from said rotation axis than said central region;

said contact surface and said at least one abutting surface being movable in the axial direction relative to each other to achieve a phased angular orientation configuration, in which said contact surface does not hold the cap on said support and in which said at least one abutting surface abuts on the protrusion of the cap in said circumferential abutting direction, and an axial holding configuration, in which said contact surface axially holds the cap on said support and in which said at least one abutting surface abuts on the protrusion of the cap in said circumferential abutting direction.

2. The cutting apparatus according to claim 1, wherein said support is movable axially to approach, and move away from, said spindle, with the possibility to take a spaced apart position, in which said support is far from said path, and a gripping position, in which said support is close to said path so as to be able to hold the cap in said preset position.

3. The cutting apparatus according to claim 1, wherein said engaging portion is movable along a direction that is parallel to said rotation axis between a first position, in which said engaging portion is close to said path, and a second position, in which said engaging portion is far from said path.

4. The cutting apparatus according to claim 1, wherein said projection has an elongated shape in which a greater dimension of said projection extends radially with respect to said rotation axis.

5. The cutting apparatus according to claim 1, wherein said spindle includes an adjustment device for setting a distance of said projection from said support, where said distance is taken along said rotation axis.

6. The cutting apparatus according to claim 1, wherein said contact surface is placed on an end of a pusher element equipped with an elastic member arranged for pushing axially said contact surface against the cap on said support, said contact surface being curved and defining a convexity on said end of said pusher element.

7. The cutting apparatus according to claim 1, wherein said spindle includes a base body which is rotatable around said rotation axis together with said spindle, said engaging portion being arranged on a gripping body which is slidable with respect to said base body along said rotation axis, said apparatus including a further elastic member configured to exert on said projection an axial force which is capable to allow said projection to make axial displacements with respect to said gripping body towards said support.

8. The cutting apparatus according to claim 1, wherein said spindle includes an annular wall which is outside said engaging portion and which extends around said rotation axis, said annular wall being arranged for providing an abutment on said cutting device.

9. The cutting apparatus according to claim 1, wherein said spindle includes a base body which extends around said rotation axis and which is rotatable around said rotation axis together with said spindle, said engaging portion being arranged on a gripping body which is slidable with respect to said base body along said rotation axis, said gripping body being rotatable together with said base body to allow said engaging portion to contact the cap and rotate the cap.

* * * * *